US008536984B2

(12) United States Patent
Benetz et al.

(10) Patent No.: US 8,536,984 B2
(45) Date of Patent: Sep. 17, 2013

(54) METHOD OF SEMI-AUTOMATIC BALLAST REPLACEMENT

(75) Inventors: Frank H. Benetz, Slatedale, PA (US); John H. Bull, Coplay, PA (US); Thomas Richard Hinds, Breinigsville, PA (US); William H. Howe, Pennsburg, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 447 days.

(21) Appl. No.: 12/719,933

(22) Filed: Mar. 9, 2010

(65) Prior Publication Data

US 2010/0241255 A1 Sep. 23, 2010

Related U.S. Application Data

(60) Provisional application No. 61/162,153, filed on Mar. 20, 2009.

(51) Int. Cl.
*G05B 11/01* (2006.01)

(52) U.S. Cl.
USPC .................. 340/12.28; 340/12.52; 340/10.42; 340/9.11; 340/3.51; 340/3.52; 340/4.3; 315/312; 315/318; 315/316; 315/297

(58) Field of Classification Search
USPC ................ 315/312, 316, 318, 319, 292, 294, 315/297; 340/3.5, 3.51, 3.52, 3.7, 4.11, 12.22, 340/12.23, 10.42, 318, 332, 539.28, 545.2, 340/4.3, 4.21, 9.1, 12.28, 12.51, 12.52; 307/18, 307/19, 38–41; 700/90
See application file for complete search history.

(56) References Cited

U.S. PATENT DOCUMENTS 5,962,991 A * 10/1999 Levy ............................ 315/312
6,859,644 B2 2/2005 Wang
6,983,783 B2 1/2006 Carmen et al.
7,307,542 B1 12/2007 Chandler et al.
7,369,060 B2 * 5/2008 Veskovic et al. ............... 340/4.3
7,391,297 B2 6/2008 Cash et al.
7,417,556 B2 8/2008 Ling
7,548,150 B2 6/2009 Huber et al.

(Continued)

FOREIGN PATENT DOCUMENTS

WO WO 2008/068693 6/2008

OTHER PUBLICATIONS

U.S. Appl. No. 12/718,273, filed Mar. 5, 2010, Veskovic.

(Continued)

*Primary Examiner* — Haiss Philogene
(74) *Attorney, Agent, or Firm* — Mark E. Rose; Philip N. Smith; Bridget L. McDonough

(57) ABSTRACT

The present invention relates to a semi-automatic method of replacing a ballast within a lighting control system, such that the new replacement ballast can operate in the same manner as the ballast that was replaced. If multiple ballasts in a lighting control system are removed from the system and multiple new ballasts are installed to replace those ballasts, any operational configurations such as group configurations or area information associated with each removed (missing) ballast must be assigned to the proper new replacement ballast. The semi-automatic replacement method relies upon the operational configurations of the removed ballast to help a user identify which new ballast should replace each missing ballast.

73 Claims, 7 Drawing Sheets

(56) References Cited

U.S. PATENT DOCUMENTS

| | | | | |
|---|---|---|---|---|
| 7,675,195 | B2 * | 3/2010 | Mierta | 307/40 |
| 7,936,281 | B2 * | 5/2011 | Cash et al. | 340/9.1 |
| 2004/0217718 | A1 | 11/2004 | Kumar et al. | |
| 2005/0179404 | A1 | 8/2005 | Veskovic et al. | |
| 2006/0049935 | A1 | 3/2006 | Giannopoulos et al. | |
| 2006/0202851 | A1 | 9/2006 | Cash et al. | |
| 2008/0068126 | A1 | 3/2008 | Johnson et al. | |
| 2008/0088435 | A1 | 4/2008 | Cash et al. | |
| 2008/0092075 | A1 | 4/2008 | Jacob et al. | |
| 2008/0114811 | A1 | 5/2008 | Murdoch | |
| 2008/0218087 | A1 | 9/2008 | Crouse et al. | |
| 2009/0273433 | A1 | 11/2009 | Rigatti et al. | |

OTHER PUBLICATIONS

European Patent Office, International Search Report and Written Opinion for International Patent Application No. PCT/US2010/027600, Jul. 5, 2012, 18 pages.

* cited by examiner

METHOD OF SEMI-AUTOMATIC BALLAST REPLACEMENT

RELATED APPLICATIONS

This application claims priority from commonly-assigned U.S. Provisional Application Ser. No. 61/162,153, filed Mar. 20, 2009, entitled METHOD OF SEMI-AUTOMATIC BALLAST REPLACEMENT, the entire disclosure of which is hereby incorporated by reference.

BACKGROUND OF THE INVENTION

1. Field of the Invention

The present invention relates to a semi-automatic method of replacing a device within a load control system, such that the new replacement device can operate in the same manner as the device that was replaced. Particularly, the invention relates to a method of configuring replacement ballasts in a lighting control system, and the method requires limited user input.

2. Description of the Related Art

A typical prior art load control system is operable to control the amount of power delivered to one or more electrical loads, such as lighting loads or motor loads, from an alternating-current (AC) power source. A lighting control system generally comprises a plurality of control devices coupled to a communication link to allow for communication between the control devices. The control devices of a lighting control system include lighting control devices (e.g., electronic dimming ballasts for control of fluorescent lamps and/or dimmer circuits for control of other lighting loads) operable to control the amount of power delivered to the lighting loads (and thus, the intensity of the lighting loads) in response to digital messages received via the communication link. In addition, the control devices of a lighting control system often include one or more input devices, such as keypads or sensor devices, that transmit messages via the communication link in order to control the loads coupled to the lighting control devices.

Lighting control systems for fluorescent lamps typically comprise a controller that communicates with a plurality of electronic dimming ballasts via a digital communication link. The controller may communicate with the ballasts using, for example, the industry-standard Digital Addressable Lighting Interface (DALI) communication protocol. The DALI protocol allows each ballast in the lighting control system to be assigned a unique digital address, such as a short address, and as a result, each ballast can control a fluorescent lamp in response to commands transmitted via the communication link. The commands may be transmitted by wall-mounted keypads coupled to the communication link, or by handheld devices, such as infrared (IR) remote controls or personal digital assistants (PDA). The commands transmitted by handheld devices are received by an IR receiving sensor that is coupled to the communication link and is operable to send appropriate commands to the controlled ballasts. In addition to IR receiving sensors, the lighting control system may also include daylight sensors or occupancy sensors. The daylight and occupancy sensors are operable to be coupled to the communication link and to monitor the condition (e.g., the ambient light level or motion from an occupant, respectively) of a space and send appropriate commands to the controlled ballasts in response to the sensed conditions in the space.

When the lighting control system is initially installed, each ballast must be configured appropriately. A ballast may be initially configured with specific operational configurations such as a group configuration. For example, a ballast may be configured to be included in a particular group with other ballasts that are responsive to commands received from a particular IR receiver such that the group of ballasts may be controlled together in response to an IR command. Typically, a unique group identifier, such as a group address, is associated with each particular group, and this group identifier forms part of the group configuration of each ballast. Thus, every ballast that belongs to a particular group is responsive to any commands that include the unique group identifier or group address that corresponds to the group. The ballast may also be configured to be included in, for example, a group of ballasts that are responsive to commands received from a particular daylight sensor, or a group of ballasts that are responsive to a particular occupancy sensor. Again, all ballasts within a particular group are operable to be controlled together, and a single ballast may belong to multiple groups and as a result, is responsive to multiple commands that include different group identifiers. In addition, the ballast may be further configured with certain individual operational configurations, such as minimum and maximum light intensity, preset light intensities, and other parameters.

In order to maintain these configurations, the controller of the lighting control system is operable to store and update these configurations as needed. In addition, the controller may also be operable to store information regarding the particular area within a building that a ballast is installed (such as a floor number, room, quadrant, etc.). Typically, this information is stored by the controller during the initial setup and installation of the lighting control system.

It may be desirable to replace an existing ballast with a new ballast. The configurations that were associated with the replaced (existing) ballast must be reassigned to the new replacement ballast such that the new ballast will operate in the same fashion as the replaced ballast had operated. For example, if the replaced ballast had been configured to operate as a member of a group of ballasts that are responsive to an occupancy sensor, then the new ballast, once installed in the same location as the replaced ballast, must also be configured to operate in the same ballast group responsive to the occupancy sensor (in the same manner as the replaced ballast).

Some prior art lighting control systems require a user to completely re-program all or portions of the lighting control system in order to configure the new replacement ballast to operate in the same fashion as the replaced ballast. This method can be very time-consuming for a user. Another prior art method of reconfiguring a new replacement ballast comprises using a hand-held PDA to run a ballast replacement program in which the user enters a unique serial number of the replaced ballast and a unique serial number of the new replacement ballast. The PDA transmits these serial numbers to an IR receiver within the lighting control system. Once these serial numbers are received by the controller via the communication link, the controller updates the configurations accordingly such that the new ballast will operate in the same groups and with the same individual operating parameters as the replaced ballast. This method of reconfiguration is described in greater detail in U.S. Pat. No. 7,391,297, issued Jun. 24, 2008, entitled HANDHELD PROGRAMMER FOR LIGHTING CONTROL SYSTEM, the entire disclosure of which is hereby incorporated by reference.

This prior art method of reconfiguration can be tedious as the user must input the serial numbers of both the replaced and new ballasts. If many ballasts are replaced in the lighting control system, the prior art method becomes even more tedious as more serial numbers must be entered. In addition, some installers or users may fully install the new ballast before realizing that the serial number (typically printed on the product) is needed to facilitate the reconfiguration process. Thus, there exists a need for a method of semi-automatic ballast replacement and reconfiguration that does not require a user to completely re-program a new ballast and does not require a user to enter any serial numbers.

SUMMARY OF THE INVENTION

According to an embodiment of the present invention, a semi-automatic procedure of replacing a first device with a second device in a lighting control system requires limited user input to facilitate the replacement procedure. The method comprises the steps of: (1) a controller identifying an operational configuration of the first device; (2) determining that the second device should adopt the operational configuration; and (3) the controller assigning the operational configuration to the second device. For example, the operational configuration of the first device may comprise a group configuration, and the group configuration may help the user determine that the second device is the replacement for the first device.

According to another embodiment of the present invention, a semi-automatic procedure of replacing a plurality of first devices within a lighting control system with a plurality of second devices, having the same number as the plurality of first devices, requires limited user input to facilitate the replacement procedure. Each of the plurality of first devices is characterized by a plurality of operational configurations, and the method comprises the steps of: (1) a controller determining that each device within the plurality of first devices share the same plurality of operational configurations; (2) determining that the plurality of second devices should adopt the plurality of operational configurations of the plurality of first devices; and (3) the controller assigning the plurality of operational configurations to the plurality of second devices.

According to another embodiment of the present invention, a semi-automatic procedure of replacing a first ballast with a second ballast within a lighting control system, wherein each ballast is operable to control a respective fluorescent lamp, is disclosed. The first ballast is among a plurality of ballasts missing from the lighting control system. The method comprises the steps of: (1) a controller detecting that a plurality of ballasts including the first ballast are missing from the lighting control system; (2) the controller identifying a first operational configuration of the first ballast; (3) the controller determining that the first operational configuration of the first ballast is not shared with the other ballast of the plurality of missing ballasts; (4) determining that a second ballast should adopt the first operational configuration of the first ballast; and (5) the controller assigning the first operational configuration to the second ballast.

According to yet another embodiment of the invention, a semi-automatic procedure of replacing a first ballast with a second ballast within a lighting control system uses the group configuration of the first ballast and requires limited user input to facilitate the replacement procedure. The method comprises the steps of: (1) providing a first ballast having a first configuration and a second ballast having a second configuration in the lighting control system; (2) designating said first and second ballasts to be members of a first group such that they may be controlled collectively; (3) storing the first group designation within the first and second configurations associated with the respective first and second ballasts; (4) detecting that said first ballast has been removed from the lighting control system; (5) detecting that a third ballast is unconfigured in the lighting control system; (6) causing said third ballast to provide a first visual indication; (7) causing said first group of ballasts (i.e., said second ballast) to provide a second visual indication; (8) determining that said third ballast belongs in the first group; and (9) assigning the first configuration associated with the first ballast to the third ballast.

According to another embodiment of the invention, a semi-automatic procedure of replacing a first ballast with a second ballast within a lighting control system uses the area to which the first ballast was associated to facilitate the replacement procedure. The method comprises the steps of: (1) prompting a user to select a first area to which the first ballast was associated; (2) a controller polling a communication link to determine whether there are any missing ballasts in the first area; (3) the controller determining that the first ballast is missing in response to the step of polling the communication link; (4) the controller polling the communication link to identify any unconfigured ballasts; (5) the controller determining that the second ballast is unconfigured; (6) the controller causing the second ballast to flash its respective lamp; (7) determining that the second ballast should be associated with the first area; and (8) the controller automatically assigning the operational configuration of the first ballast to the second ballast if the first ballast is the only missing ballast in the first area.

According to another embodiment of the invention, a semi-automatic procedure of replacing a first ballast with a second ballast within a lighting control system uses the area to which the first ballast was associated to facilitate the replacement procedure. The method comprises the steps of: (1) prompting a user to select a first area to which the first ballast was associated; (2) a controller polling a communication link to determine whether there are any missing ballasts in the first area; (3) the controller determining that the first ballast and a third ballast are missing in the first area in response to the step of polling the communication link; (4) the controller polling the communication link to identify any unconfigured ballasts; (5) the controller determining that the second ballast is unconfigured; (6) determining that the second ballast should be associated with the first area; and (7) the controller assigning a plurality of operational configurations of the first ballast to the second ballast if the plurality of operational configurations of the first ballast is shared with the third ballast.

According to another embodiment of the invention, a semi-automatic procedure of replacing a first ballast with a second ballast within a lighting control system uses the area to which the first ballast was associated to facilitate the replacement procedure. The method comprises the steps of: (1) prompting a user to select a first area to which the first ballast was associated; (2) a controller polling a communication link to determine whether there are any missing ballasts in the first area; (3) the controller determining that the first ballast is missing in response to the step of polling the communication link; (4) the controller polling the communication link to identify any unconfigured ballasts; (5) the controller determining that the second ballast is unconfigured; (6) the controller assigning a temporary address to the second ballast; (7) the controller causing the second ballast to flash its respective lamp; (8) determining that the second ballast should be associated with the first area; and (9) the controller assigning an operational configuration of the first ballast to the second ballast.

DETAILED DESCRIPTION OF THE INVENTION

Figure 1:
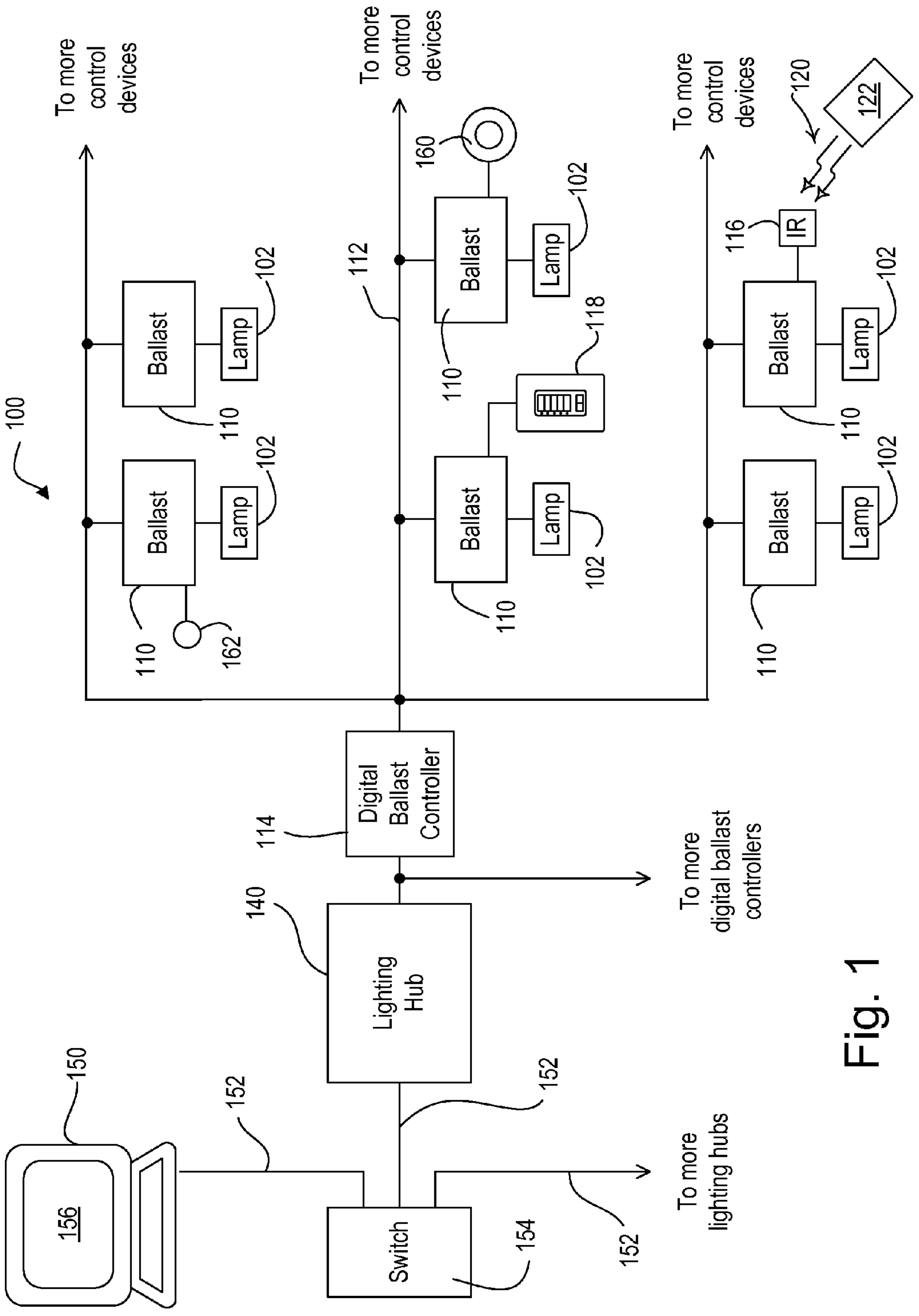
FIG. 1 is a simplified block diagram of a lighting control system according to the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a lighting control system 100 according to the present invention. The lighting control system 100 is operable to control the level of illumination in a space by controlling the intensity level of the artificial lighting in the space. As shown in FIG. 1, the lighting control system 100 is operable to control the amount of power delivered to (and thus the intensity of) a plurality of lighting loads, e.g., a plurality of fluorescent lamps 102.

Each of the fluorescent lamps 102 is coupled to one of a plurality of digital electronic dimming ballasts 110 for control of the intensity of the lamp. The ballasts 110 are operable to communicate with each other via a digital ballast communication link 112. For example, the digital ballast communication link 112 may comprise a digital addressable lighting interface (DALI) communication link. Alternatively, the ballast communication link 112 may comprise an extended DALI protocol link or a proprietary communication link described in greater detail in U.S. Pat. No. 7,369,060, issued May 6, 2008, entitled DISTRIBUTED INTELLIGENCE BALLAST SYSTEM AND EXTENDED LIGHTING CONTROL PROTOCOL, the entire disclosure of which is hereby incorporated by reference. The digital ballast communication link 112 is also coupled to a digital ballast controller (DBC) 114, that provides the necessary direct-current (DC) voltage to power the communication link 112 and assists in the programming of the lighting control system 100. The digital ballast controller 114 is also operable to send and receive digital messages to and from the ballasts 110 via the communication link 112. The digital ballast controller 114 is also operable to store and maintain the operational configurations regarding the operation of each ballast 110 (such as group configurations, preset lighting intensities, minimum and maximum light intensities, and other operating parameters).

The ballasts 110 are operable to receive input signals from a plurality of input devices, such as, for example, an occupancy sensor 160, a daylight sensor 162, an infrared (IR) receiver 116, or a wall control device 118 (e.g., a wall-mounted keypad device). The ballasts 110 are operable to transmit digital messages to the other ballasts 110 in response to the input signals received from the various input devices. As shown in FIG. 1, these input devices are coupled directly to the ballasts 110. However, these input devices may alternatively be coupled directly to the communication link 112 or directly to the digital ballast controller 114. Alternatively, the input devices could be coupled to the digital ballast controller 114 and/or the ballasts 110 via a wireless communication link, such as a radio frequency (RF) communication link or an IR communication link.

The ballasts 110 may receive digital commands from IR signals 120 transmitted by a handheld remote control 122 via the IR receiver 116. The handheld remote control 122 may comprise, for example, a personal digital assistant (PDA) which includes a graphical user interface (GUI). The remote control 122 is operable to configure the ballasts 110 by transmitting configuration information to the ballasts via the IR signals 120. Accordingly, a user of the remote control 122 is operable to configure the operation of the ballasts 110. For example, the user may configure a plurality of ballasts 110 into a single group, which may be responsive to a command from the occupancy sensor 160. An example of a method of using a handheld remote control to configure ballasts is described in greater detail in U.S. Pat. No. 7,391,297, issued Jun. 24, 2008, entitled HANDHELD PROGRAMMER FOR LIGHTING CONTROL SYSTEM, the entire disclosure of which is hereby incorporated by reference.

The lighting control system 100 may further comprise a central controller, e.g., a lighting hub 140, that allows for communication between a personal computer (PC) 150 and the load control devices, i.e., the ballasts 110. The lighting hub 140 is coupled to the digital ballast controller 114, which is coupled to the ballasts 110 on the digital ballast communication link 112. The lighting hub 140 and the PC 150 are coupled to an Ethernet link 152, such that the PC 150 is operable to transmit digital messages to the lighting hub 140 via a standard Ethernet switch 154. An example of a lighting control system comprising a lighting hub, a PC, and an Ethernet link are described in greater detail in U.S. patent application Ser. No. 11/938,039, filed Nov. 9, 2007, entitled INTERPROCESSOR COMMUNICATION LINK FOR A LOAD CONTROL SYSTEM, the entire disclosure of which is hereby incorporated by reference. Alternatively, the Ethernet link 152 may directly couple the digital ballast controller 114 to a wireless local area network router (not shown). In addition, the handheld remote control 122 may be operable to wirelessly communicate with the local area network router. For example, the handheld remote control 122 may comprise a smart cellular phone, such as an iPhone manufactured by Apple Inc.

Additional lighting hubs 140 may be connected to the Ethernet link 152 via the Ethernet switch 154 to allow additional digital ballast controllers 114 or additional load control devices to be included in the lighting control system 100. Typically, one digital ballast controller 114 may be coupled to a predetermined maximum number of ballasts (e.g., up to sixty-four ballasts) via the digital ballast communication link 112. Typically, the plurality of ballasts 110 that are coupled to a single digital ballast controller 114 are referred to as a "loop" of ballasts. If more than the predetermined maximum number of ballasts per loop is needed for the lighting control system 100, another digital ballast controller 114 and another "loop" of ballasts can be added. In addition, if multiple loops are installed in the lighting control system 100, the particular loop to which a ballast 110 belongs may also be stored as an operational configuration. For example, each digital ballast controller 114 may have a unique identifier or address, and the operational configurations of each ballast may contain the unique identifier of the digital ballast controller to which the ballast is coupled.

The PC 150 executes graphical user interface (GUI) software, which is displayed on a PC screen 156. The GUI allows the user to configure, control, and monitor the operation of the lighting control system 100. During configuration of the lighting control system 100, the user is operable to determine how many ballasts 110, digital ballast controllers 114, and lighting hubs 140 are present in the system using the GUI software. Further, the GUI software may allow the user to designate one or more of the ballasts to be included in a particular group that is responsive to commands received from, for example, a particular IR receiver—such that a group of ballasts may be controlled together in response to an IR command. Typically, a unique group identifier, such as a group address, is associated with each particular group, and this forms part of the operational configuration of a ballast. Thus, every ballast that belongs to a particular group is responsive to any commands that include the unique group identifier or group address that corresponds to the group.

Additionally, the GUI software provides a way for the user to group the ballasts 110 by a particular area within a building. For example, the user may organize and group the ballasts 110 by floor number (e.g., first, second, etc.), building quadrant (east, south, etc.), room name (e.g., Walt's office, etc.) and the like. The PC 150 is also operable to transmit an alert to the user in response to a fault condition, such as, for example, a failed fluorescent lamp. This alert may include the area to which the failed lamp and corresponding ballast belong such that the user may locate the failed lamp more readily. Specifically, the PC 150 sends an email, prints an alert page on a printer, or displays an alert screen on the PC screen 156. Additionally, the lighting hubs 140 and the PC 150 include astronomical time clocks, such that the lighting hubs and the PC are operable to control the ballasts 110 in response to the present time of day and programmed events.

Figure 2:
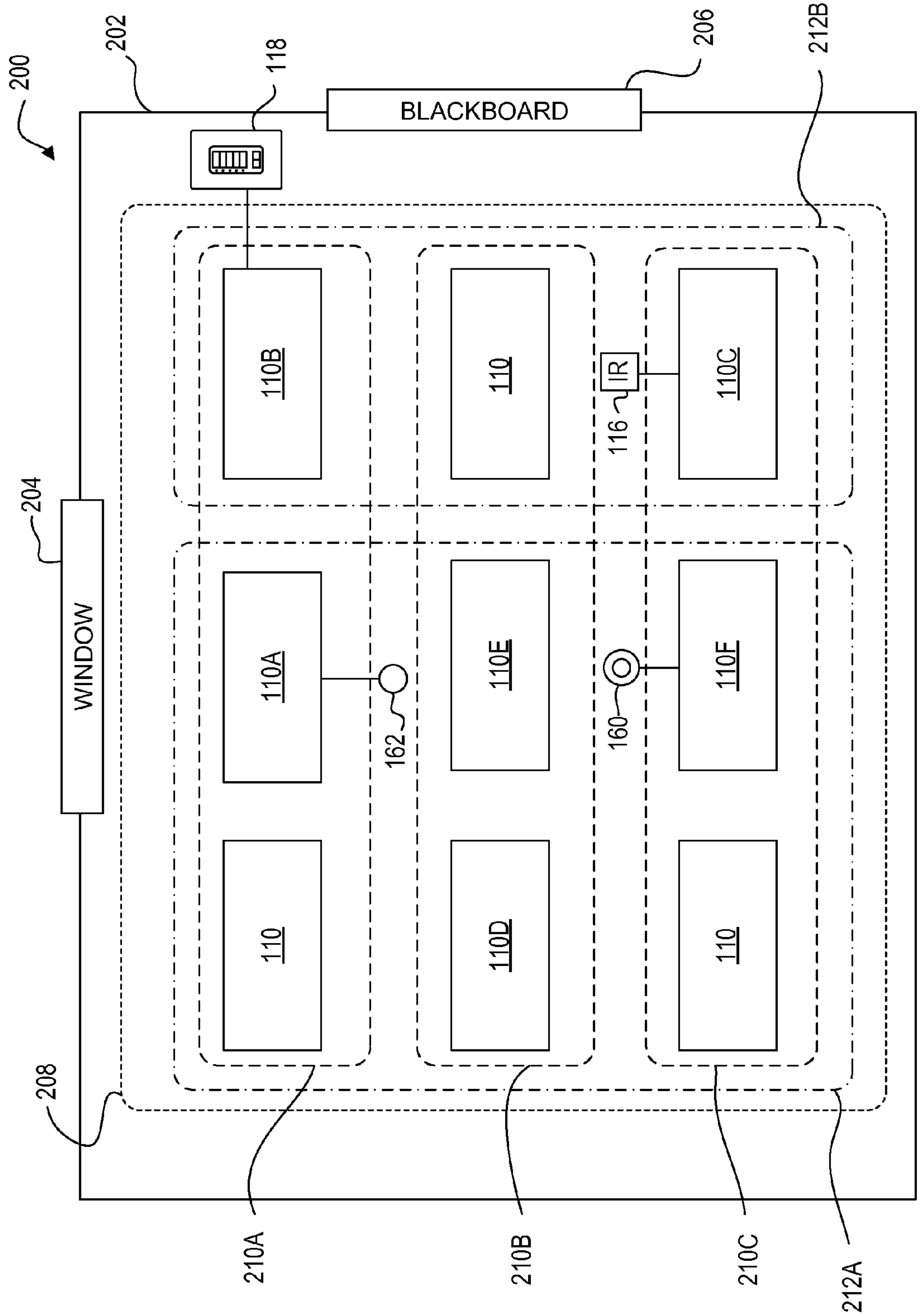
FIG. 2 is a simplified application diagram of the lighting control system of FIG. 1.

FIG. 2 is a simplified diagram of an example application 200 for the lighting control system 100. Application 200 represents a classroom 202 that includes a window 204 and a blackboard 206. The classroom 202 includes nine ballasts 110 of the lighting control system 100. All of the nine ballasts 110 have been grouped together to operate as a single occupancy group 208. The occupancy group 208 comprises a unique group identifier (or group address), and all nine ballasts 110 are responsive to any commands which comprise the unique group identifier. In other words, the operational configuration of all nine ballasts 110 includes the group identifier (or address) that corresponds to the occupancy group 208. Thus, all nine ballasts may be controlled collectively in response to the occupancy sensor 160 which is coupled directly to ballast 110F. For example, all nine ballasts can automatically turn on when the occupancy sensor 160 detects an occupancy condition and/or automatically turn off when the occupancy sensor 160 detects a vacancy condition in the classroom 202.

The nine ballasts 110 in classroom 202 have also been grouped into three daylight groups 210A, 210B, and 210C. Daylight group 210A includes the row of three ballasts which are located closest to the window 204. Daylight group 210B includes the center row of three ballasts, and daylight group 210C includes the row of three ballasts located farthest from the window 204. The daylight sensor 162 is coupled to ballast 110A. Each of the ballasts 110 within a given daylight group is configured such that the ballasts are controlled in response to signals received from the daylight sensor 162. For example, the greatest amount of natural light will be present closest to the window, so the three ballasts 110 of daylight group 210A are configured to be more affected by signals received from the daylight sensor 162 (i.e., have a greater gain). When an appreciable amount of natural light is detected, the three ballasts 110 of daylight group 210A may be controlled to a lower light intensity in order to save energy. The three ballasts 110 of daylight group 210C (farthest from the window 204) are configured to be less affected by the daylight sensor 162, since less natural light will reach the area farthest from the window. The three ballasts of daylight group 210B in the center of the room (with respect to the window) will be more affected by the signals received from the daylight sensor 162 than daylight group 210C and less affected than daylight group 210A. Thus, the control of the ballasts 110 of daylight groups 210A, 210B, and 210C can be coordinated so as to maintain a substantially constant level of illumination throughout the classroom 202.

Each daylight group 210A, 210B, 210C also comprises a unique group identifier or group address which forms part of the operational configurations of the ballasts 110. For example, the operational configurations of the row of three ballasts which are located closest to the window 204 include the unique group identifier that corresponds to the daylight group 210A. Thus, multiple daylight groups can be configured differently in response to the daylight sensor 162, and each of the ballasts within a given daylight group operates together in response to signals received from the daylight sensor 162.

The nine ballasts 110 have also been grouped into, for example, two control groups (or zones) 212A, 212B. Control group 212A includes six ballasts located farthest from the blackboard 206, and control group 212B includes three ballasts located closest to the blackboard 206. The control groups 212A, 212B may be controlled in response to commands initiated by the wall control device 118 which is directly coupled to ballast 110B. Thus, a single wall control device 118 may control these control groups separately.

For example, if an instructor desires to illuminate the area near the blackboard 206 to a greater intensity level, actuations of a button (or buttons) of wall control device 118 control the ballasts of group 212B to go to a greater light intensity level and the ballasts of group 212A to go to a lower light intensity level. Each control group 212A, 212B also comprises a unique group identifier or group address that forms part of the operational configurations of the ballasts 110 in a manner similar to that discussed above with respect to the occupancy and daylight groups 208, 210A, 210B, and 210C. Thus, multiple control groups may be configured to respond differently in response to signals that include the proper group identifier received from wall control device 118.

In addition, the control groups 212A, 212B may be controlled in response to commands initiated by the handheld remote control device 122. The handheld remote control device 122 may be operable to send wireless infrared signals 120 to an IR receiver 116 coupled to ballast 110C, or alternatively may send wireless radio frequency (RF) signals to an RF receiver (not shown). The RF receiver may be a separate device coupled to the communication link 112, or alternatively may be integrated into the digital ballast controller 114, the wall control device 118, or the ballasts 110.

As shown in FIG. 2, ballast 110A is included within (is a member of) occupancy group 208, daylight group 210A, and control group 212A. Ballast 110B resides in the same occupancy group 208 and daylight group 210A as ballast 110A. However, ballast 110B resides in control group 212B (unlike ballast 110A). Ballast 110C resides in the same occupancy group 208 as ballasts 110A, 110B. Ballast 110C also resides in the same control group 212B as ballast 110B. However, ballast 110C resides in daylight group 210C. Thus, if existing ballasts 110A, 110B, 110C needed to be replaced, they would be removed from the lighting control system 100, and each newly installed ballast intended to replace ballasts 110A, 110B, and 110C would require its own unique configuration in order to operate in the same fashion as ballasts 110A, 110B, and 110C, respectively.

Some ballasts 110 of a lighting control system 100 may share the exact same group configurations as one another. For example, ballasts 110D and 110E are both in the same occupancy group 208, the same daylight group 210B, and the same control group 212A. In addition, neither of these ballasts 110D, 110E are directly coupled to an input device (such as a daylight sensor 162). Because ballasts 110D and 110E share all of the same group configurations, the group configuration of these two ballasts is not unique with respect to each other. However, the group configuration of ballasts 110D and 110E is unique with respect to the group configurations of ballasts 110A, 110B, and 110C. Thus, if the five ballasts 110A-110E were all removed from the classroom 202, the newly installed ballasts intended to replace ballasts 110A, 110B, and 110C would require their own unique configurations, and the newly installed ballasts intended to replace ballasts 110D, 110E would require the same configuration as one another, yet different from the configurations of ballasts 110A, 110B, 110C.

Figure 3A:
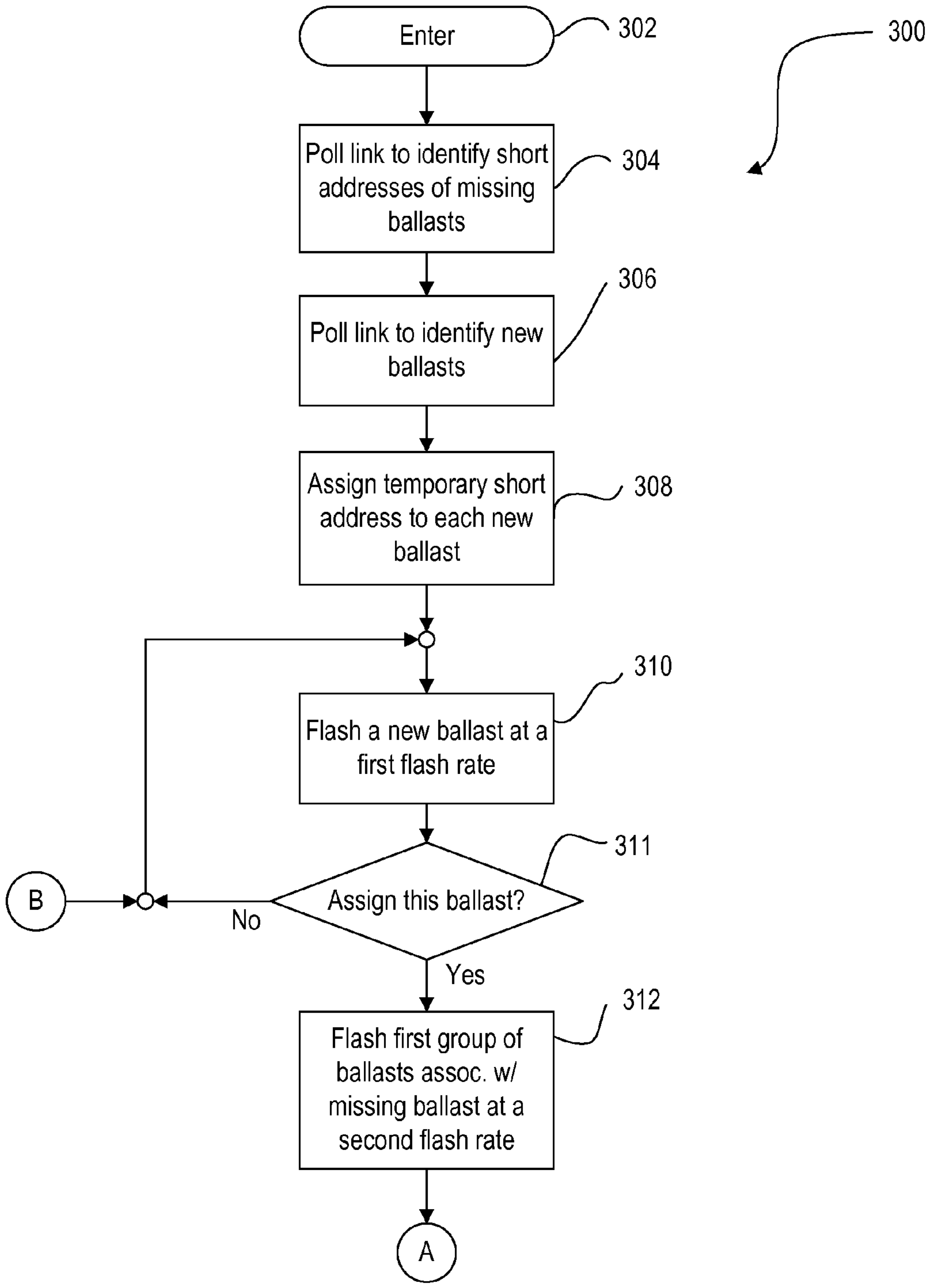
FIGS. 3A and 3B are simplified flowcharts of a replacement procedure of the lighting control system of FIG. 1 according to a first embodiment of the invention.
Figure 3B:
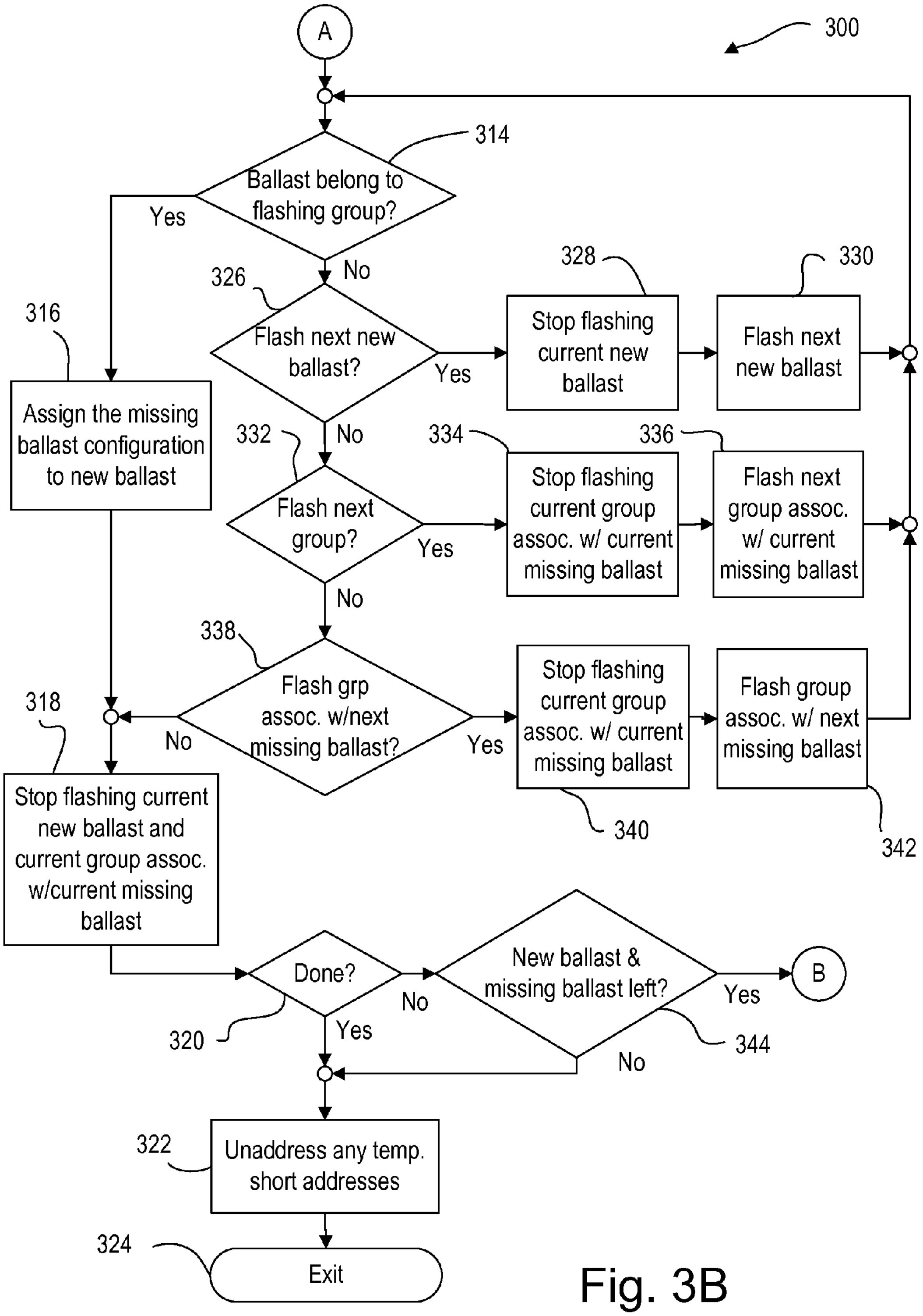

FIGS. 3A and 3B show a simplified flowchart of a ballast replacement process 300 according to a first embodiment of the invention. The ballast replacement process 300 uses the group configurations that were associated with a missing or removed ballast to provide a perceivable indication to a user so that the proper configuration of a newly installed ballast can be determined. Specifically, the lamps of the remaining ballasts of a group with which the missing ballast was associated are flashed along with the lamp of a newly installed ballast as will be discussed in further detail below.

At step 302, the process is entered. Typically, this process would be initiated after at least one old ballast has been removed from the lighting control system and at least one new ballast has been installed to replace the old ballast in the lighting control system. A user could initiate this process through a user interface of the lighting control system, which may be displayed on the GUI of the PC 150 or the hand held remote control 122. In addition, a 'controller,' as described with respect to the replacement processes 300, 400, and 500, may reside in the digital ballast controller 114, the lighting hub 140, or within a ballast 110.

At step 304, the controller polls the communication link to identify any ballasts that are missing from the link by sending out a particular message to each ballast at each short address. If a ballast at a given address does not respond to the controller after being polled multiple times, the controller considers this address as belonging to a missing ballast. A 'missing' ballast includes any ballast 110 that is non-responsive, faulty, or disconnected/removed from the lighting control system 100. At step 306, the controller polls the communication link to identify any new ballasts. A new ballast on the link would appear to be unconfigured (e.g., the new unconfigured ballast would not have a short address, nor would it be programmed with any operational configurations). In the event that only one ballast is missing from the lighting control system 100 and only one new ballast has been identified, then a different ballast replacement procedure may be used. An example of such a ballast replacement procedure is described in greater detail in U.S. patent application Ser. No. 12/481,285, filed Jun. 9, 2009, entitled METHOD OF AUTOMATICALLY PROGRAMMING A NEW BALLAST ON A DIGITAL BALLAST COMMUNICATION LINK, the entire disclosure of which is hereby incorporated by reference.

At step 308, the controller assigns a temporary short address to each new ballast that has been identified. The temporary short address allows the controller to communicate individually with each new ballast via the communication link before a permanent short address is assigned (i.e., an address of a missing ballast that the new ballast is replacing). At step 310, the controller transmits a digital message to cause the first new ballast that has been identified to flash at a first flash rate (e.g., once per second). Next, the user can decide whether he would like to assign (configure) this flashing ballast at step 311 using the user interface. For example, if ballasts in various rooms have been replaced, the user may be working in one particular room at a time, and it may be more convenient for the user to configure the new ballast or ballasts that have been replaced in that particular room. Because the new ballasts are unconfigured and have only a temporary address, the new ballasts have no association with any room or area information at this point of process 300. Thus, steps 310, 311 of process 300 provide a way for the user to cycle through all of the temporary short addresses of the new ballasts such that the user can visually identify a ballast that is flashing nearby (i.e., in the same room or area that the user is working). If the user does not want to assign the presently flashing ballast at step 311, the controller stops the flashing of the current new ballast and loops back to step 310 to flash another new ballast until the user identifies a ballast that he would like to assign.

As discussed above, a missing ballast may have been assigned to multiple groups including (but not limited to) a daylight group, an occupancy group, or a control group. Typically, the control group may also be referred to as a zone. Once the user has identified a ballast that he would like to assign, the controller causes all of the ballasts assigned in a first group (e.g., a daylight group) that was associated with a first missing ballast to flash at a second flash rate (e.g., twice per second) at step 312. For example, if ballasts 110A and 110C were removed from the classroom 202 of FIG. 2 and replaced with two new ballasts, and the controller has arbitrarily selected ballast 110A as the 'first' missing ballast, then the controller would flash all of the remaining ballasts of daylight group 210A at the second flash rate. The first and second flash rates are different such that the user may distinguish between the first new ballast and the first group of ballasts associated with the first missing ballast.

If the user determines that the flashing new ballast does not belong to the flashing group at step 314, then the user can decide whether to flash a next new ballast at step 326. For example, if the currently flashing ballast group is within sight of the user, but the currently flashing new ballast does not belong to the group, then the user may decide to flash the next new ballast to find the ballast that belongs to the flashing group that the user has identified.

If the user wants to flash the next new ballast, the controller causes the current new ballast to stop flashing at step 328 and causes the next new ballast to flash at the first flash rate at step 330. Once the next new ballast is flashing, the user can again decide at step 314 whether the new ballast belongs to the current flashing group. If the flashing ballast does not belong to the flashing group, then the user may repeat the steps 326, 328, 330, and 314 to cycle through each new ballast to determine whether it belongs to the currently flashing group.

Alternatively, the user may decide not to flash the next new ballast at step 326, and may instead decide to flash the next group that was associated with the current missing ballast at step 332. For example, the user could decide to select the control group as the next group associated with the first missing ballast (instead of the daylight group that is currently flashing). At step 334, the controller causes the current flashing group to cease flashing and causes the next group (i.e., the control group) associated with the current missing ballast to flash at the second flash rate at step 336. For example, referring back to the previous example of classroom 202 in which ballasts 110A and 110C are missing and ballast 110A is the current missing ballast, the controller would cause the remaining ballasts of control group 212A to flash at step 336.

Once the next group is flashing, the user can again determine at step 314 whether the new ballast belongs to the current flashing group. If the flashing ballast does not belong to the flashing group, then the user may repeat the steps 326, 332, 334, 336 and 314 to cycle through each group associated with the current missing ballast to determine whether the flashing new ballast belongs to it. By flashing the multiple groups associated with a single missing ballast, the user can better distinguish how the missing ballast had been grouped, and thus, can make a better determination whether a new ballast belongs to all of the same groups as those of the missing ballast.

Alternatively, if the user decides not to the flash the next group associated with the current missing ballast at step 332, the user could then decide to flash a group associated with the next missing ballast at step 338. At step 340, the controller causes the current group to stop flashing and causes the first group associated with the next missing ballast to start flashing at a second flash rate at step 342. For example, the controller could select missing ballast 110C as the next missing ballast instead of ballast 110A, and proceed to flash the remaining ballasts belonging to daylight group 210C. Once the next group is flashing, the user can again determine at step 314 whether the new ballast belongs to the current flashing group. If the flashing ballast does not belong to the flashing group, then the user may repeat the steps 326, 332, 338, 340, 342, and 314 to cycle through the first group associated with each missing ballast to determine whether the flashing new ballast belongs to it.

If the new ballast belongs to the flashing group at step 314, then at step 316, the controller assigns the configuration of the missing ballast that was associated with the flashing group to the new ballast. Typically, when the new ballast is assigned the configuration of the missing ballast, the new ballast is also assigned the short address that had belonged to the missing ballast. Thus, the ‘missing’ ballast is no longer considered missing by the controller as the new ballast has successfully replaced the missing ballast.

If the user does not want to flash the group associated with the next missing ballast at step 338, or after the assignment step 316, then the controller causes the new ballast and the current group of ballasts associated with the missing ballast to stop flashing at step 318. At step 320, the user can indicate whether they are done with (or need to stop) the replacement process 300. If the user is done, then at step 322, any temporary addresses that were assigned to new ballasts at step 308 are removed, and the process 300 exits at step 324. Step 322 ensures that if the user were to initiate the process 300 at another time, the new ballasts would be initially identified as unaddressed, unconfigured ballasts. If the user is not done at step 320, then at step 344, the controller confirms whether there are any other new ballasts that have not been configured (e.g., new ballasts that have not been assigned a configuration of a missing ballast) and whether there are any missing ballasts whose configuration has not been reassigned to a new ballast. If there is at least one new ballast and at least one missing ballast present in the system, then the process 300 loops back to flash a new ballast at step 310, such that the user may repeat the process for another new ballast. Otherwise, any temporary addresses that were assigned to a new ballast at step 308 are removed, and the process 300 exits at step 324.

Figure 4A:
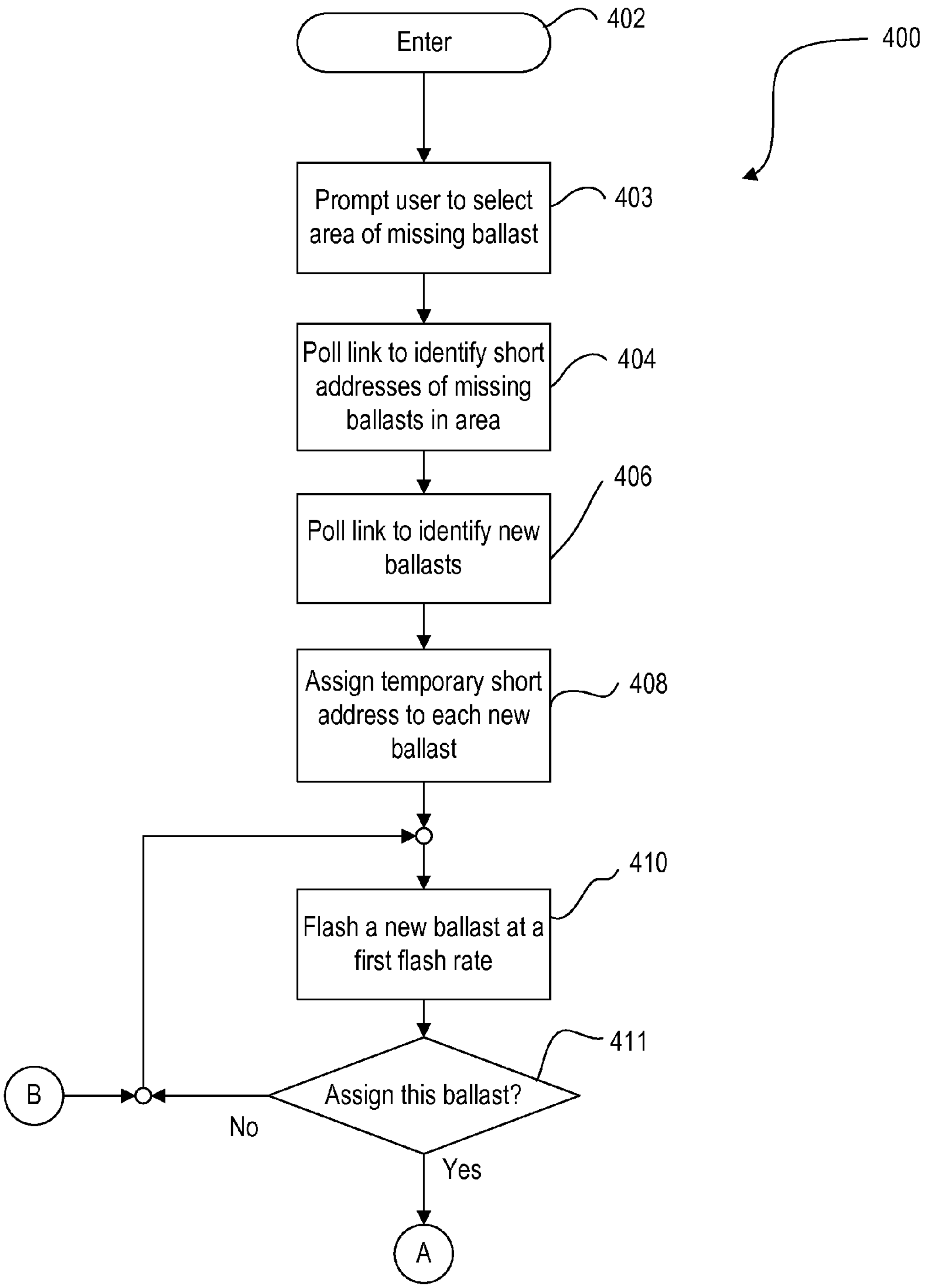
FIGS. 4A and 4B are simplified flowcharts of a replacement procedure of the lighting control system of FIG. 1 according to a second embodiment of the invention.
Figure 4B:
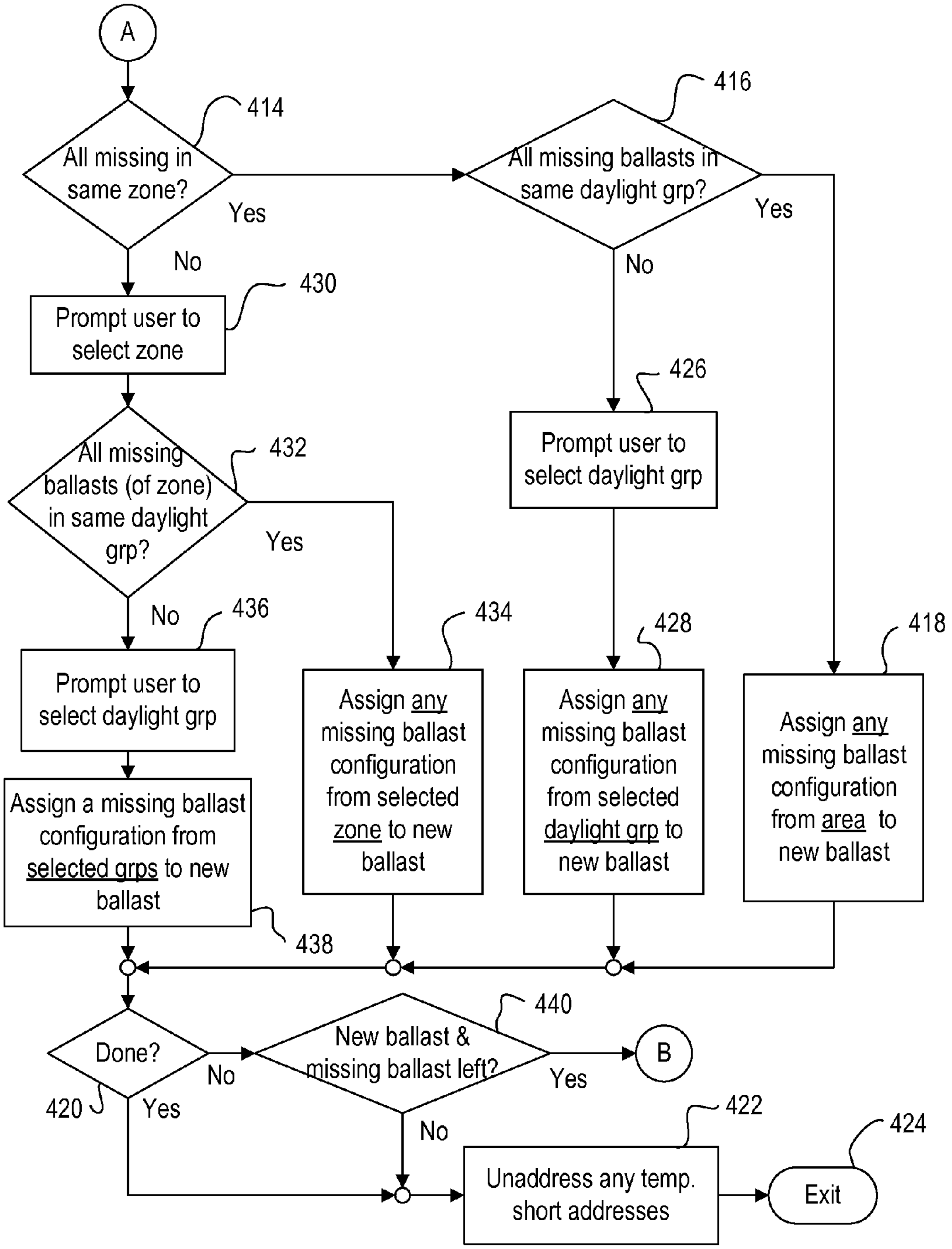

FIG. 4A and FIG. 4B show a simplified flowchart of the ballast replacement process 400 according to a second embodiment of the invention. The second embodiment is similar to the first embodiment of the replacement process 300 in some ways. However, the second embodiment is able to identify a ballast group that is unique to one of the missing ballasts in order to make the replacement process faster and easier for the user.

For example, referring back to FIG. 2, in the event that ballasts 110A, 110B, 110C of classroom 202 are to be replaced, the user could remove those ballasts and replace them with new ballasts 110A', 110B', 110C' (not shown) respectively. Table 1 below illustrates the group configurations of the ballasts 110A, 110B, 110C.

TABLE 1

Group Configurations of Ballasts 110A-110C

| | Occ. Group | Daylight Group | | | Control Group | |
|---|---|---|---|---|---|---|
| Ballast | 208 | 210A | 210B | 210C | 212A | 212B |
| 110A | X | X | | | X | |
| 110B | X | X | | | | X |
| 110C | X | | | X | | X |

Because the removed (missing) ballasts 110A, 110B, 110C all belong to the same occupancy group 208, flashing the remaining ballasts 110 in that occupancy group 208 will not help the user determine that new ballast 110A' is the replacement for missing ballast 110A, new ballast 110B' is the replacement for missing ballast 110B, or new ballast 110C' is the replacement for missing ballast 110C. However, because the missing ballast 110A is the only missing ballast that belonged to control group 212A, the wall control device 212A group is unique to the missing ballast 110A. In other words, the operational configuration of ballast 110A, comprising control group 212A, is not shared by the other missing ballasts. Thus, flashing the remaining ballasts 110 in the control group 212A will help the user more readily determine which new ballast is the replacement for missing ballast 110A. Similarly, the daylight group 210C is unique to the missing ballast 110C. Thus, flashing the remaining ballasts 110 in the daylight group 210C will help the user determine that new ballast 110C' is the replacement for missing ballast 110C.

The missing ballast 110B, however, does not belong to a ballast group that is distinct from the ballast groups to which the other missing ballasts 110A and 110C belong. Specifically, the missing ballast 110B belongs to the same occupancy group 208 as missing ballasts 110A and 110C, the same daylight group 210A as missing ballast 110A, and the same control group 212B as missing ballast 110C. Thus, if the user were to attempt to replace the missing ballast 110B first (before replacing missing ballasts 110A and 110C), there is not an available ballast group that is distinct from the ballast groups to which the other missing ballasts belong, thus the replacement process 400 would flash any of the ballast groups to which the missing ballast 110B had belonged in order to help the user identify the missing ballast that should be replaced (similar to the replacement process 300 previously discussed). According to an alternate embodiment, the replacement process 400 could recommend a missing ballast to replace first, wherein the recommended missing ballast belongs to at least one unique group as compared to the other missing ballasts. For example, the replacement process 400 could recommend that the user start to replace ballast 110A instead of ballast 110B. Thus, once ballast 110A is successfully replaced with new ballast 110A', daylight group 210B is unique to ballast 110B as compared to the other missing ballast (i.e., ballast 110C).

As discussed previously, ballasts 110D and 110E of classroom 202 share the same group configurations as one another. Table 2 illustrates the group configurations of ballasts 110D, 110E.

TABLE 2

Group Configurations of Ballasts 110D, 110E

| | Occ. Group | Daylight Group | | | Control Group | |
|---|---|---|---|---|---|---|
| Ballast | 208 | 210A | 210B | 210C | 212A | 212B |
| 110D | X | | X | | X | |
| 110E | X | | X | | X | |

Thus, if these two ballasts have failed and are replaced with new ballasts 110D' and 110E' (not shown), the group configuration of either ballast 110D or 110E can be assigned to either new ballast 110D' or 110E'. In other words, because the group configurations of ballasts 110D, 110E are identical, the configuration of ballast 110D can be assigned to either new ballast 110D' or 110E', and the configuration of ballast 110E can be assigned to either new ballast 110D' or 110E' in order for the ballasts to operate properly. The replacement process 400 is operable to recognize when multiple missing ballasts share identical group configurations and does not require the user to make further determinations under such circumstances.

In addition, the replacement process 400 relies upon area information associated with the missing ballasts in order to facilitate the replacement process. For example, the classroom 202 of FIG. 2 may be one of many classrooms within a building. During the installation of the lighting control system 100 in the building, all of the ballasts within each room may be associated with area information corresponding to the general location to which the ballast is installed (such as a room number of a classroom) using the GUI software of PC 150. This area information forms part of the operational configuration of each ballast 110 and is stored in the PC 150, the lighting hub 140, the digital ballast controller 114, and/or the ballasts themselves. For example, classroom 202 may be one of the areas of the lighting control system, and the nine ballasts 110 installed in this classroom may be associated with area information that corresponds to classroom 202. In some cases, an area may be configured to operate as an occupancy group, e.g. occupancy group 208.

Referring back to FIG. 4A and FIG. 4B, the process 400 is entered at step 402, and at step 403, the user is prompted to select an area that contains a missing ballast. For example, the user could select classroom 202 by room number or room name from among a plurality of classrooms. At step 404, the controller polls the communication link to identify any ballasts that are missing from the link in the area that was selected by the user. Step 404 is similar to step 304 of process 300, however step 404 only identifies missing ballasts within a particular area. At step 406, the controller polls the communication link to identify the new ballasts (similar to step 306 of process 300). A new ballast on the link would appear to be unconfigured (e.g., the new unconfigured ballast would not have a short address, nor would it be programmed with operational configurations). At step 408, the controller assigns a temporary short address to each new ballast (similar to step 308 of process 300).

At step 410, the controller causes the first new ballast that has been identified to flash at a first flash rate (e.g., once per second). Next, the user determines whether he would like to assign (configure) this flashing ballast at step 411 using the user interface. If the user does not want to assign the flashing ballast at step 411, the process stops flashing the current new ballast and loops back to step 410 to flash another new ballast until the user identifies a ballast that he would like to assign (in a similar fashion as steps 310 and 311 of process 300). Typically, the user would select a flashing ballast from the area that was selected at step 403.

At step 414, the controller determines whether all of the ballasts missing from the selected area belong to the same zone. For example, if the user has selected classroom 202 (FIG. 2), and only ballasts 110D, 110E are missing from the classroom 202, because all of these ballasts belong to the same zone (or control group 212A), the controller would determine that all of the ballasts missing from the selected area belong to the same zone. Then, the controller determines whether all of the missing ballasts also belong in the same daylight group at step 416.

Considering the previous example in which ballasts 110D, 110E are the only ballasts missing from the classroom 202, then the controller would determine that the ballasts do belong to the same daylight group (210B) at step 416. At step 418, the controller would arbitrarily assign any missing ballast configuration from the selected area (e.g., the configuration of either ballast 110D or 110E) to the presently flashing new ballast at step 418. Because the previous steps in the process 400 have determined that the configurations of the missing ballasts are identical to one another within the selected area, the configuration of any missing ballast within the area can be assigned to the flashing new ballast.

If the controller determines that all of the missing ballasts are in the same zone at step 414, but are not in the same daylight group at step 416, the user is prompted at step 426 to select the daylight group of the missing ballast that the user desires to replace. At step 426, the daylight groups of the selected area are displayed to the user via the GUI such that the user can select the daylight group of the missing ballast that the user desires to replace. The user may also select an option to flash the remaining ballasts belonging to a selected daylight group in order to visually determine (or confirm) which daylight group the missing ballast had belonged. After the user has selected the daylight group at step 426, the controller assigns any missing ballast configuration from the selected daylight group in the area to the presently flashing ballast at step 428. Because all of the missing ballasts belong to the same zone within the selected area, and because the user has selected the daylight group, the configuration of any missing ballast belonging to the selected daylight group can be assigned to the new ballast.

If the controller determines that all of the missing ballasts do not belong to the same zone at step 414, the user is then prompted to select the zone at step 430. At step 430, the zones of the selected area are displayed to the user via the GUI (similar to how the daylight groups were displayed at step 426). The user may also select an option to flash the remaining ballasts belonging to a selected zone in order to determine (or confirm) which zone the missing ballast had belonged to, and to thus select the proper zone. Once the user selects the zone, then the controller determines whether all of the ballasts missing from the selected area and zone all belong to the same daylight group at step 432. If so, then the controller assigns any missing ballast configuration from the selected zone in the area to the presently flashing ballast at step 434. Because all of the missing ballasts belong to the same daylight group within the selected zone of the selected area, the configuration of any missing ballast belonging to the selected zone can be assigned to the new ballast.

If the missing ballasts of the selected zone do not belong to the same daylight group at step 432, then the user is prompted to select the daylight group of the ballast that the user desires to replace at step 436. At step 436, the daylight groups of the selected area are displayed to the user via the GUI. The user may also select an option to flash the remaining ballasts belonging to a selected daylight group in order to determine (or confirm) which daylight group the missing ballast had belonged to, and to thus, select the proper daylight group for the ballast that will replace the missing ballast. After the user has selected the daylight group at step 436, the controller assigns a missing ballast configuration from the selected zone in the area and the selected daylight group in the area to the presently flashing ballast at step 438.

After an assignment is completed at step 438, 434, 428, or 418, the user can indicate whether they are done with (or need to stop) the replacement process 400 at step 420. If the user is done, then any temporary addresses that were assigned to a new ballast (at step 408) are removed at step 422, and the process 400 exits at step 424. Step 422 ensures that if the user were to initiate the replacement process 400 at another time, the new ballasts would be initially identified as unaddressed, unconfigured ballasts (similar to steps 322 of process 300). If the user is not done at step 420, the controller confirms at step 440 whether there are any other new ballasts that have not been configured (e.g., new ballasts that have not been assigned a configuration of a missing ballast), and whether there are any missing ballasts whose configuration has not been reassigned to a new ballast. If there is at least one new ballast and at least one missing ballast present in the system at step 440, then the process 400 loops back to flash a new ballast at step 410, such that the user may repeat the process for another new ballast. Otherwise, any temporary addresses that were assigned to a new ballast (at step 408) are removed at step 422, and the process 400 exits at step 424.

Figure 5:
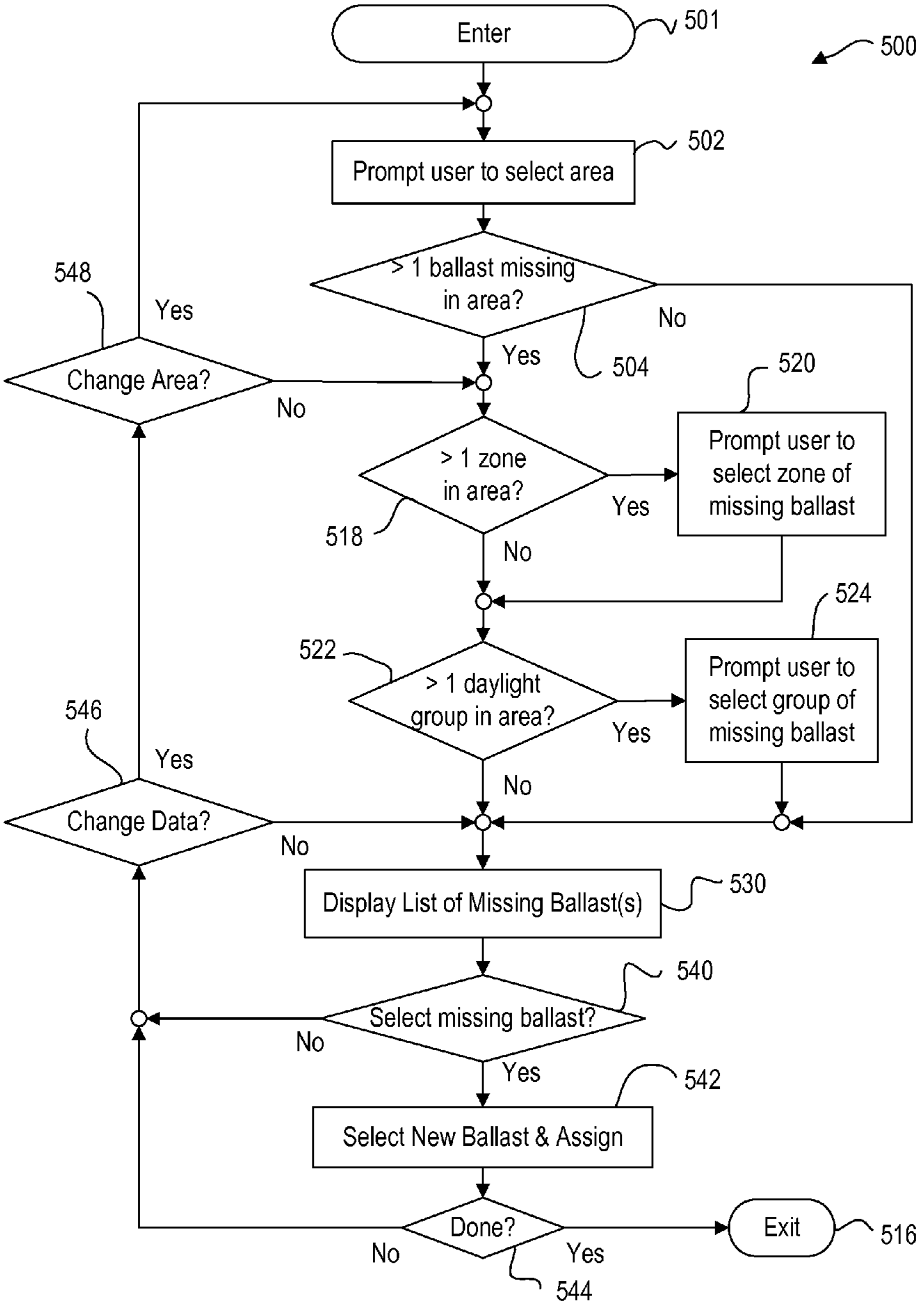
FIG. 5 is a simplified flowchart of a replacement procedure of the lighting control system of FIG. 1 according to a third embodiment of the invention.

FIG. 5 shows a simplified flowchart of the ballast replacement process 500 according to a third embodiment of the invention. The third embodiment of the replacement process is similar to replacement process 400 in that the process relies upon area information associated with the missing ballasts in order to facilitate the replacement process. In addition, the third embodiment allows a user to select a missing ballast by name. For example, during the installation process when an installer is naming and defining the areas to which certain ballasts belong, the installer may also name ballasts individually, and this information is presented to the user during the replacement process 500.

The ballast replacement process 500 is entered at step 501, and the user is first prompted by a GUI to select an area in which a ballast is missing at step 502. Upon selecting the area, the controller then queries the communication link to identify any missing ballasts associated with the selected area, queries the link to identify any new ballasts, and assigns temporary short addresses to any new ballasts that are identified (similar to steps 404, 406, and 408 of process 400). At step 504, the controller determines whether more than one ballast is missing from the selected area.

If there is more than one ballast missing in the selected area at step 504, then the controller determines whether there is more than one zone (control group) in the selected area at step 518. If there is more than one zone in the selected area, then the user is prompted to select the zone of the missing ballast that they would like to replace first at step 520. At step 520, the zones of the selected area are displayed to the user via the GUI. The user may also select an option to flash the different zones of the area in order to determine (or confirm) which zone the missing ballast had belonged to, and to thus select the proper zone. Additionally, if the user is uncertain of the zone, the user need not select a zone at step 520. For example, the user could select an "I don't know" option to proceed. If there is one zone (or no zones) at step 518, then there is no need for the user to provide any more information about the zone as all of the ballasts in the selected area belong to the same zone, thus the process continues.

At step 522, the controller determines whether there is more than one daylight group in the selected area. If there is more than one daylight group at step 522, the user is prompted to select the daylight group using the GUI at step 524 (in a similar fashion as described above for selecting the zone at step 520). Again, the user may select an option to flash the different daylight groups of the area in order to determine (or confirm) which daylight group the missing ballast had belonged to, and to thus select the proper daylight group. Additionally, if the user is uncertain, the user need not select a daylight group at step 524. For example, the user could select an "I don't know" option to proceed. If there is one daylight group (or no daylight groups) at step 522, then there is no need for the user to provide any more information about the daylight group as all of the ballasts in the selected area belong to the same daylight group, thus the process continues.

If there is not more than one ballast missing at step 504, then the missing ballast is displayed by name (as named during initial installation and set-up) on the GUI along with its group configurations at step 530. (In the event that there are no missing ballasts in the selected area, then the GUI would simply notify the user that there are no missing ballasts in the selected area at step 530.) If there was more than one ballast missing at step 504, then the controller generates a list of the missing ballast or ballasts within the area that meet any additional criteria selected by the user (e.g., the selected zone at step 520 and/or daylight group at step 524) and displays that list on the GUI at step 530. In other words, the criteria selected by the user acts as a filter to reduce the number of missing ballast(s) displayed on the list at step 530. For example, if the controller had determined that there were multiple zones and daylight groups within the selected area, and the user had selected the "I don't know" option at step 520 and step 524, then all of the missing ballasts in the selected area are included on the list at step 530 as the list of missing ballasts is not filtered by a selected zone and a selected daylight group. If the user had selected the "I don't know" option at step 520 or at step 524, then the list of missing ballasts at step 530 would not be filtered by either a selected zone or a selected daylight group, respectively.

At step 540, the user has the option of selecting the missing ballast by name from the displayed list. If the user does not select a missing ballast, then at step 546, the user has the option of changing the data (or criteria) previously provided at steps 502, 520, and 524. If the user does select a missing ballast by name at step 540, then the user can select, at step 542, a new ballast to be assigned with the operational configurations of the selected missing ballast (at step 540). At step 542, the controller causes a new ballast to flash, and the user can either decide to assign (configure) this new flashing ballast or to cycle through other new ballasts to identify another new ballast (similar to steps 410, 411 of process 400). Typically, the user would identify a new flashing ballast from the area that was selected at step 502 and that appears to belong to any of the criteria selected at steps 520, 524. Once the user identifies and selects the proper new ballast, that new ballast is assigned with the operational configurations of the selected missing ballast at step 542, such that the new ballast becomes the replacement for the missing ballast (i.e., the missing ballast is no longer 'missing').

At step 544, the user can decide whether they are done with (or need to stop) the replacement process 500. If the user is done, then any temporary addresses that were assigned to new ballasts are removed (similar to step 422 of process 400), and the process 500 exits at step 516. If the user is not done at step 544 (i.e., there are more missing ballasts in the system that the user would like to replace), the user can decide whether to change any previously selected data (or criteria) at step 546. If the user does not want to change any data at step 546, then the list of missing ballast(s) based on the previous selections is displayed to the user at step 530. For example, if multiple missing ballasts were displayed at step 530 based on the previous selections, then the user may want to identify the new replacement ballasts for each of those missing ballasts before changing any criteria.

If the user does want to change the data at step 546, then the user can decide whether to select a different area at step 548. If the user does want to select a different area at step 548, then the process loops to step 502 such that the user can select an area. Otherwise, the process loops to step 518 such that the user can select a different zone and/or daylight group to identify other missing ballasts in the presently selected area.

As previously discussed, the particular loop (the plurality of ballasts coupled to a single digital ballast controller) to which a ballast belongs may be stored as an operational configuration of the ballast. Thus, the replacement processes described herein may also be able to properly configure new replacement ballasts using the particular loop operational configuration. For example, if two ballasts from different loops are removed from the lighting control system, and two new ballasts are installed to replace them, the controller can quickly determine the loops to which the missing ballasts belonged and the loops to which the new ballasts are installed, thus facilitating the replacement process. In other words, the particular loop to which a ballast belongs can be used as a distinguishing characteristic among the missing and new ballasts to determine the proper configurations of the new ballasts during the replacement processes.

In addition, if a ballast is directly coupled to a particular input device (e.g., an occupancy sensor, a daylight sensor, etc.), that information may also be stored as part of the operational configurations of that ballast (i.e., whether a ballast was coupled to a device, and if so, the type of input device). For example, referring back to FIG. 2, ballasts 110A, 110B, 110C, and 110F are each coupled to different input devices. Thus, the configuration information of ballast 110A may include information associated with daylight sensor 162, the configuration information of ballast 110B may include information associated with wall control device 118, the configuration information of ballast 110C may include information associated with IR receiver 116, and the configuration information of ballast 110F may include information associated with occupancy sensor 160. If a new ballast is installed to replace one of these ballasts and is coupled directly to the same input device, then the replacement processes described herein may also be able to properly configure the new ballast once the controller determines that the new ballast is coupled to the same input device to which the missing ballast had been coupled.

Further, the operational configuration of a ballast may alternatively include ballast type information, such as whether the ballast is a switching or dimming device, its rated lamp type (i.e., linear or compact fluorescent or LED lamp), its rated lamp number (one, two, three lamps), and the like. Thus, if a ballast is removed from the system and replaced with a new ballast, the replacement processes described herein may also be able to properly configure the new ballast once the controller determines the ballast type of the new ballast and the missing ballast. In other words, the ballast type can be used as a distinguishing characteristic among the missing and new ballasts to determine the proper configurations of the new ballasts during the replacement processes.

In short, the operational configurations of a ballast may comprise any combination of the following configurations: group configurations, such as daylight groups, control/zone groups, occupancy groups, and area groups; a loop configuration, an input device type configuration, and a ballast type configuration.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of replacing a first device with a second device in a lighting control system having a controller, the method comprising the steps of:

identifying by the controller an operational configuration of the first device;

determining that the second device should adopt the operational configuration; and controller assigning by the controller the operational configuration to the second device.

2. The method of claim 1, wherein the first and second devices comprise first and second electronic ballasts, the ballasts operable to control the intensity of a first lamp.

3. The method of claim 2, wherein the controller is a digital ballast controller and is operable to communicate with the electronic ballasts via a communication link.

4. The method of claim 3, wherein the digital ballast controller is operable to store the operational configuration of the first ballast.

5. The method of claim 4, wherein the operational configuration comprises a group identifier.

6. The method of claim 5, wherein the group identifier designates the first ballast and a third ballast to be controlled together, the third ballast operable to control the intensity of a third lamp.

7. The method of claim 6, wherein the group identifier is associated with at least one of the following input devices: an occupancy sensor, a daylight sensor, an infrared (IR) receiver, or a keypad control device.

8. The method of claim 6, wherein the step of identifying further comprises the step of providing by the third ballast a user-perceivable indication.

9. The method of claim 8, wherein the step of providing by the third ballast the user-perceivable indication further comprises:

causing the third ballast to flash the third lamp.

10. The method of claim 3, wherein the step of determining further comprises the step of providing by the second ballast a user-perceivable indication.

11. The method of claim 10 wherein the step of the second ballast providing the user-perceivable indication further comprises:

causing the second ballast to flash the first lamp.

12. The method of claim 1, wherein the first device is missing from the lighting control system.

13. The method of claim 12, wherein the second device is installed in place of the first device.

14. The method of claim 13, further comprising the step of:

detecting by the controller that the second device is unconfigured.

15. The method of claim 12, further comprising the step of:

detecting by the controller that the first device is missing from the lighting control system.

16. The method of claim 12, wherein a first plurality of devices are missing from the lighting control system.

17. The method of claim 16, wherein the operational configuration of the first device is not shared by the devices of the first plurality of devices.

18. The method of claim 1, wherein the first device comprises a plurality of operational configurations and the step of assigning further comprises:

assigning by the controller the plurality of operational configurations of the first device to the second device.

19. The method of claim 18, wherein the first device comprises a short address, and the step of assigning further comprises:

assigning by the controller the short address of the first device to the second device.

20. The method of claim 19, wherein the operational configuration comprises an area with which the first device is associated.

21. The method of claim 1, wherein the operational configuration comprises a device type.

22. The method of claim 1, wherein the operational configuration comprises whether an input device is coupled to the first device.

23. The method of claim 22, wherein the operational configuration comprises an input device type.

24. The method of claim 1, wherein the step of determining that the second device should adopt the operational configuration of the first device is performed automatically by the controller.

25. The method of claim 1, wherein the step of determining that the second device should adopt the operational configuration is performed in response to a user input.

26. A method of replacing a plurality of first devices with a plurality of second devices having the same number as the plurality of first devices within a lighting control system having a controller, wherein each device is characterized by a plurality of operational configurations, the method comprising the steps of:

determining by the controller that each device within the plurality of first devices shares the same plurality of operational configurations;

determining that the plurality of second devices should adopt the plurality of operational configurations of the plurality of first devices; and assigning by the controller the plurality of operational configurations to the plurality of second devices.

27. The method of claim 26, further comprising the steps of:

identifying by the controller a first operational configuration of a third device which is not shared with the plurality of operational configurations of the plurality of first devices;

determining that a fourth device should adopt the first operational configuration; and assigning by the controller the first operational configuration to the fourth device.

28. The method of claim 26, wherein the pluralities of first and second devices comprise pluralities of first and second electronic ballasts, respectively, operable to control the intensities of respective lamps.

29. The method of claim 28, wherein the controller is a digital ballast controller and is operable to communicate with the electronic ballasts via a communication link.

30. The method of claim 29, wherein the digital ballast controller is operable to store the plurality of operational configurations of the plurality of first devices.

31. The method of claim 30, wherein the plurality of operational configurations comprises at least one group identifier.

32. The method of claim 26, wherein the plurality of first devices is missing from the lighting control system.

33. The method of claim 32, wherein the plurality of second devices is installed in place of the plurality of first devices.

34. The method of claim 33, further comprising the step of:

detecting by the controller that the plurality of second devices is unconfigured.

35. The method of claim 32, further comprising the step of:

detecting by the controller that the plurality of first devices is missing from the lighting control system.

36. The method of claim 26, wherein the plurality of operational configurations comprises at least an area to which the plurality of first devices is associated.

37. The method of claim 26, wherein the step of determining that the plurality of second devices should adopt the plurality of operational configurations of the plurality of first devices is performed automatically by the controller.

38. The method of claim 26, wherein the step of determining that the plurality of second devices should adopt the operational configurations of the plurality of first devices is performed in response to a user input.

39. A method of replacing a first ballast with a second ballast within a lighting control system having a controller, wherein each ballast is operable to control a fluorescent lamp, the steps comprising:

detecting by the controller that a plurality of ballasts including the first ballast is missing from the lighting control system;

identifying by the controller an operational configuration of the first ballast;

determining by the controller that the operational configuration of the first ballast is not shared with the plurality of missing ballasts;

determining that a second ballast should adopt the operational configuration of the first ballast; and assigning by the controller the operational configuration to the second ballast.

40. The method of claim 39, wherein the controller is a digital ballast controller and is operable to communicate with the plurality of ballasts via a communication link.

41. The method of claim 40, wherein the digital ballast controller is operable to store the operational configuration of the first ballast.

42. The method of claim 41, wherein the operational configuration comprises a group identifier.

43. The method of claim 42, wherein the group identifier designates the first ballast and a third ballast to be controlled together, the third ballast operable to control third lamp.

44. The method of claim 43, wherein the group identifier is associated with at least one of the following input devices: an occupancy sensor, a daylight sensor, an infrared (IR) receiver, or a keypad control device.

45. The method of claim 43, wherein the step of identifying the operational configuration of the first ballast further comprises the step of providing by the third ballast a user-perceivable indication.

46. The method of claim 45, wherein the step of the third ballast providing the user-perceivable indication further comprises:

causing the third ballast to flash its respective lamp.

47. The method of claim 39, further comprising the step of:

detecting by the controller that the second ballast is unconfigured.

48. The method of claim 39, wherein the first ballast comprises a plurality of operational configurations and the step of assigning further comprises:

assigning by the controller the plurality of operational configurations of the first ballast to the second ballast.

49. The method of claim 48, wherein the first ballast comprises a short address, and the step of assigning further comprises:

assigning by the controller the short address of the first ballast to the second ballast.

50. The method of claim 39, wherein the operational configuration comprises an area to which the first ballast is associated.

51. The method of claim 39, wherein the operational configuration comprises a device type.

52. The method of claim 39, wherein the operational configuration comprises whether an input device is coupled to the first ballast.

53. The method of claim 52, wherein the operational configuration comprises an input device type.

54. The method of claim 39, wherein the step of determining that the second ballast should adopt the operational configuration of the first ballast is performed automatically by the controller.

55. The method of claim 39, wherein the step of determining that the second ballast should adopt the operational configuration is performed in response to a user input.

56. A method of replacing a ballast in a lighting control system comprising the steps of:

providing a first ballast having a first configuration and a second ballast having a second configuration in the lighting control system;

designating said first and second ballasts to be operable as a first group such that they may be controlled collectively;

storing the first group designation within the first and second configurations associated with the respective first and second ballasts;

detecting that said first ballast has been removed from the lighting control system;

detecting that a third ballast is unconfigured in the lighting control system;

causing said third ballast to provide a first visual indication;

causing said second ballast of said first group to provide a second visual indication;

determining that said third ballast belongs in the first group; and assigning the first configuration associated with the first ballast to the third ballast.

57. A method of replacing a first ballast with a second ballast in a lighting control system wherein an operational configuration of the first ballast comprises an area association, comprising the steps of:

prompting a user to select a first area to which the first ballast was associated;

polling a communication link by a controller to determine whether there are any missing ballasts in the first area;

determining by the controller that the first ballast is missing in the first area in response to the step of polling the communication link;

polling the communication link by the controller to identify any unconfigured ballasts;

determining by the controller that the second ballast is unconfigured;

determining that the second ballast should be associated with the first area; and automatically assigning by the controller the operational configuration of the first ballast to the second ballast if the first ballast is the only missing ballast in the first area.

58. The method of claim 57, wherein the controller is a digital ballast controller and is operable to communicate with the ballasts via a communication link.

59. The method of claim 58, wherein the digital ballast controller is operable to store the operational configuration of the first ballast.

60. The method of claim 59, wherein the operational configuration comprises a group identifier.

61. The method of claim 57, wherein the first ballast comprises a plurality of operational configurations and the step of assigning further comprises:

assigning by the controller the plurality of operational configurations of the first ballast to the second ballast.

62. The method of claim 61, wherein the first ballast comprises a short address, and the step of assigning further comprises:

assigning by the controller the short address of the first ballast to the second ballast.

63. The method of claim 57, wherein the step of determining that the second ballast should be associated with the first area is performed in response to a user input.

64. A method of replacing a first ballast with a second ballast in a lighting control system having a controller comprising the steps of:

prompting a user to select a first area to which the first ballast was associated;

polling a communication link by the controller to determine whether there are any missing ballasts in the first area;

determining by the controller that the first ballast and a third ballast are missing in the first area in response to the step of polling the communication link;

polling the communication link by the controller to identify any unconfigured ballasts;

determining by the controller that the second ballast is unconfigured;

assigning by the controller a temporary address to the second ballast;

causing the second ballast to flash a respective lamp;

determining that the second ballast should be associated with the first area; and automatically assigning by the controller the plurality of operational configurations of the first ballast to the second ballast if a plurality of operational configurations of the first ballast is shared with the third ballast.

65. The method of claim 64, wherein the controller is a digital ballast controller and is operable to communicate with the ballasts via the communication link.

66. The method of claim 65, wherein the digital ballast controller is operable to store the plurality of operational configurations of the first ballast and the third ballast.

67. The method of claim 66, wherein one of the plurality of operational configurations comprises a group identifier.

68. The method of claim 67, wherein the group identifier designates the first ballast and the third ballast to be controlled together.

69. The method of claim 68, wherein the group identifier is associated with at least one of the following input devices: an occupancy sensor, a daylight sensor, an infrared (IR) receiver, or a keypad control device.

70. The method of claim 64, wherein the first ballast and third ballast comprise respective short addresses, and the step of assigning further comprises:

assigning by the controller the short address of the first ballast to the second ballast.

71. The method of claim 64, wherein one of the operational configurations comprises a device type.

72. The method of claim 64, wherein the step of determining that the second ballast should be associated with the first area is performed automatically by the controller.

73. The method of claim 64, wherein the step of determining that the second ballast should be associated with the first area is performed in response to a user input.

* * * * *